June 21, 1927.  A. ENGLE  1,633,081
MEANS FOR DISPOSING OF WASTE MATERIAL AND UTILIZING COMPONENTS THEREOF
Filed Aug. 24, 1925
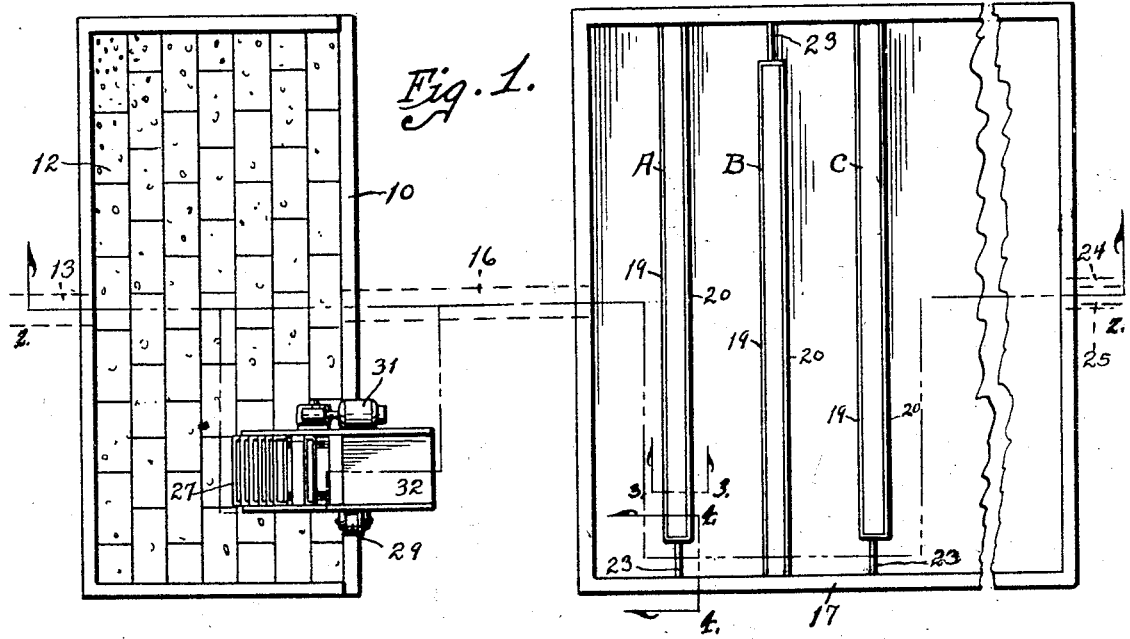
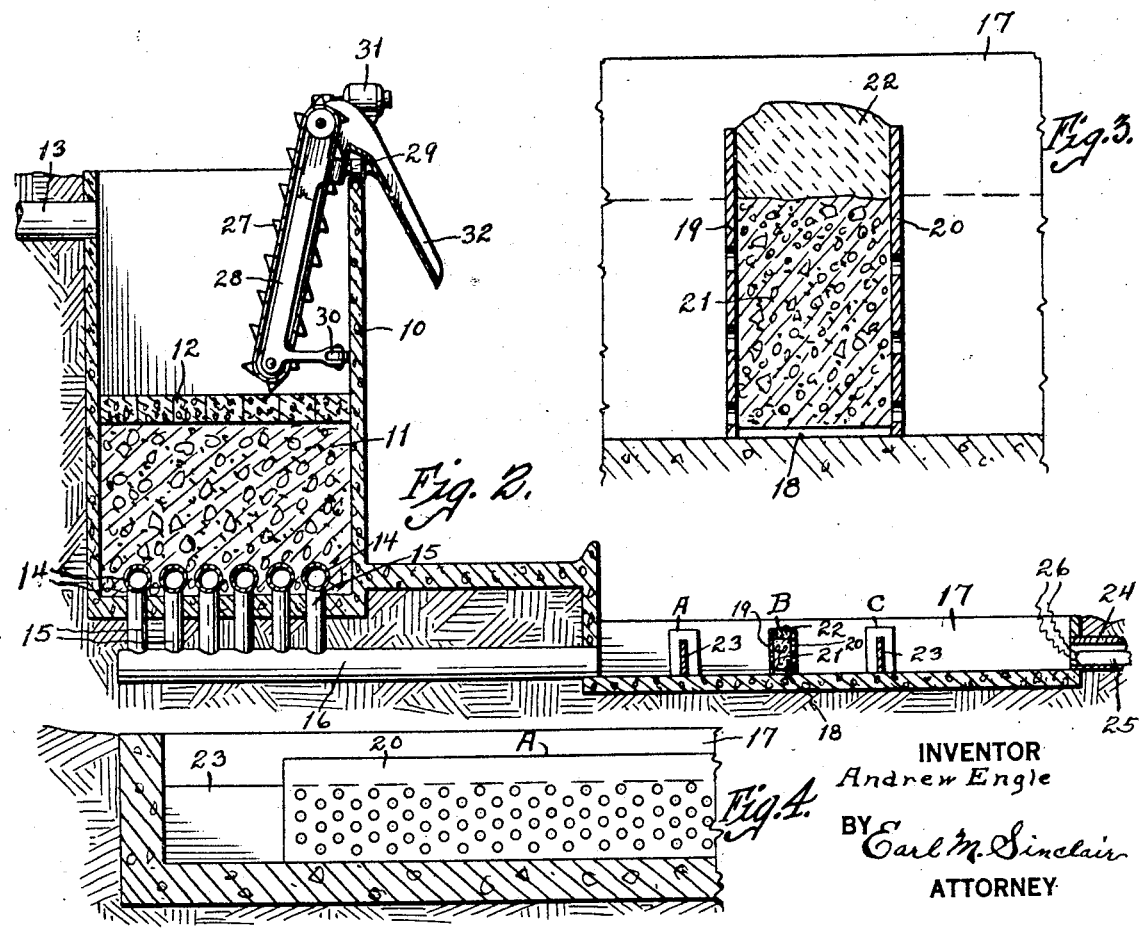
INVENTOR
Andrew Engle
BY Earl M. Sinclair
ATTORNEY Patented June 21, 1927.

1,633,081

UNITED STATES PATENT OFFICE.

ANDREW ENGLE, OF NEWTON, IOWA, ASSIGNOR OF ONE-HALF TO JAMES MAINE, OF DES MOINES, IOWA.

MEANS FOR DISPOSING OF WASTE MATERIAL AND UTILIZING COMPONENTS THEREOF.

Application filed August 24, 1925. Serial No. 52,196.

The object of this invention is to provide improved means for disposing of waste materials of a city or other community group, including sewage, night soil, garbage and the like, in a sanitary and economical way and at the same time rendering parts of such waste material fit for use as fuel, fertilizer and the like.

A further object of this invention is to provide an improved mechanism for carrying out my improved process of disposing of waste materials and utilizing components thereof.

A further object is to provide improved means for separating liquid portions from the solid of the waste matter for separate and complete treatment of said liquid portions.

A further object is to provide improved filtering beds having sanctuary for bacteria in which they may work for the production of nitrates.

A further object is to provide an improved means for collecting bacteria and nitrates into suitable vehicles with which they may be removed for use as fertilizing compositions.

A further object is to provide an improved construction for removable and replaceable filter beds.

A further object is to provide improved means for killing and destroying the bacteria after they have performed their nitrate-producing function.

With these and other objects in view, my invention consists in the construction, arrangement and combination of elements hereinafter set forth, pointed out in the claims and illustrated by the accompanying drawing, in which—

Figure 1 is a plan view, more or less diagrammatic, of an apparatus or means embodying my invention.

Figure 2 is a section on the line 2—2 of Figure 1.

Figure 3 is an enlarged cross-section on the line 3—3 of Figure 1, showing the construction of one of the filter beds and bacteria sanctuary.

Figure 4 is an enlarged longitudinal section on the line 4—4 of Figure 1, showing the same members.

In the construction of the means as shown the numeral 10 designates generally a container or receiving tank, which may be of any desired size and shape, preferably constructed of concrete, and open at its top. The lower portion of the receiving tank 10 is filled with a mass of filtering material 11, such as sand and gravel or the like, and superposed on this filtering material is a loosely laid false bottom 12 of soft brick or other substantially porous material. An inlet pipe 13 is provided leading to the upper portion of the tank 10, which is designed to carry waste products and materials thereto, such as sewage, night soil, kitchen garbage and the like. It is contemplated that under my plan kitchen garbage may be cut up, chopped or otherwise comminuted in the home, placed in the sewer, and carried with the regular sewage to my apparatus where it is disposed of. The solid portions of the waste materials are retained by and on the false bottom 12 and permitted to dry out, the liquid portions passing through the rather porous false bottom to the filtering material 11 where they are filtered and more or less clarified and purified. Disposed along the bottom of the tank 10 and covered by the filtering material 11 are a series of lines of tile 14 of substantially porous construction, adapted to receive the liquid after it has been filtered, each line having a discharge pipe 15 leading to a common conduit 16 embedded in the earth. The conduit 16 leads to an open receptacle 17, preferably of concrete and relatively shallow, which receptacle may be of any desired size and shape.

In the receptacle 17 the liquid portions are allowed to remain for a considerable time and provision is made therein for facilitating the action of the nitrate-producing bacteria, for further filtering the liquid, and for finally destroying the bacteria and then the liquid is drawn off and used. Disposed across the receptacle 17 are a number of long and narrow filtering beds and bacteria sanctuaries, in this instance three in number and designated as A, B and C. They may be increased in number if desired. Each filtering bed A, B and C is formed of a metal shell or frame, having cross-bars 18 connecting spaced side walls 19 and 20, said side walls being perforated or reticulated. The shell thus formed is filled, about up to the normal liquid level, with filtering material 21 such as sand and gravel, and superposed on this is a bacteria bed or sanctuary, 22 of soil, either clay or loam. The shells of the filtering beds A, B and C also are loosely mounted in the receptacle so that they may be moved about and from time to time removed from the receptacle 17 for various purposes. The beds A, B and C are of a length corresponding substantially to the width of the receptacle but only slightly less, the remaining space being occupied by an imperforate partition plate 23 fixed to one end of the shell and abutting the adjacent wall of the receptacle, said partition plate rising substantially to the normal liquid level. The partition plates 23 of the various filtering beds are arranged at opposite ends of successive beds, so that any liquid which overflows then must travel a sinuous course in the receptacle in passing from the inlet to the outlet end thereof, as will readily be understood from Figure 1. The receptacle is provided with an outlet pipe 24 at its opposite end, leading to any desired place of discharge.

In practical use the liquids discharged into the receptacle are successively filtered through the beds A, B and C, and as many others of similar structure as may be provided, and are gradually filtered, purified and clarified thereby. In each of the filtering beds, portions of the liquids will rise by capillary action within the filtering material and the bacteria therein are harbored and sheltered in the bacteria beds 22, which favor the activities of the bacteria in producing nitrates, and shelter them from action of atmospheric air and sunlight. Thus considerable quantities of nitrates and bacteria are accumulated not only in the soil or loam 22 but also in the filtering material of the various beds. The bacteria are gradually removed from the liquid, however, as it passes from one bed to the next, not only by the process just mentioned but also because of the action of the air and light many of them are destroyed, so that the liquid after passing the last of the beds may be practically free of bacteria. If it is thought necessary, additional means may be provided at the outlet for destroying any bacteria which may remain in the liquid, either through the application of heat (which may be produced electrically), or by the use of the ultra-violet rays. In the present instance I have indicated an ultra-violet ray tube 25 located in the discharge conduit 24, which may be supplied in any desired manner with the means for giving off the ultra-violet rays, in this instance conductors 26 connecting it with a machine of common form (not shown).

The liquids when finally discharged from the receptacle are so purified that they will sustain under-water life, and may safely be deposited in streams or other bodies of water without detriment to the fish life therein or to the health of any community which may be located below.

In addition the filtering material 21 and bacteria beds 22 should be removed from time to time and spread upon the soil or otherwise employed as fertilizing agents, as they contain the valuable nitrates produced by the bacteria. It is convenient to entirely remove the shells of the beds A, B, C and so on, for taking out the material therein, putting in new material, and also to permit cleaning of the receptacle, by scraping or flushing.

The solid portions remaining in the tank 10 may also be removed, and I have shown an endless conveyor 27 for that purpose, carried by a frame 28 having a roller 29 running on a track at the top of one wall of the tank, and another roller 30 engaging the inner surface of said wall. The conveyor 27 may be operated in any suitable manner, as by a motor 31 carried thereby, to elevate solid matter from the tank and discharge it through a spout 32 to wagons, trucks, or other desired conveyances. It may be utilized as a fertilizing composition, by further treatment if desired, or as a fuel.

It is obvious that this apparatus may be constructed in suitable units of any desired size, for serving any community as a convenient, economical, sanitary and in fact a money-making way of disposing of the waste materials mentioned.

I claim as my invention—

1. In a device of the class described, a separate unit comprising a shell open at its top and having perforated side walls, spaced bars connecting lower portions of said side walls, a filtering material filling the lower portion of said shell, and a bacteria harboring medium such as soil superposed on said filtering material and adapted to receive bacteria-carrying liquid by capillary action therefrom.

2. In a device of the class described, an open receptacle, and a series of spaced shells arranged transversely thereof, each shell having perforated sides and containing a filtering material with a bacteria-harboring medium superposed thereon, each shell being of slightly less length than the width of the receptacle, and an imperforate partition plate connecting the shell to the adjacent wall of the receptacle.

3. In a device of the class described, an open receptacle, and a series of shells of slightly less length than the width of the receptacle and spaced apart transversely thereof, each shell having perforated walls and filled to about the normal liquid level of the receptacle with filtering material, a bacteria-harboring substance such as soil superposed on said filtering material, and imperforate partitions at opposite ends of successive shells connecting them with adjacent walls of the receptacle, said partitions also rising to substantially the normal liquid level of the receptacle.

Signed at Des Moines, in the county of Polk and State of Iowa, this 15th day of August, 1925.

ANDREW ENGLE.